INVENTOR.
Milford A. Campbell
BY
Harness, Dickey & Pierce,
ATTORNEYS.

Dec. 21, 1965  M. A. CAMPBELL  3,224,553
VIBRATORY WORK FEEDING AND ORIENTING UNIT
Filed Feb. 27, 1963  4 Sheets-Sheet 2
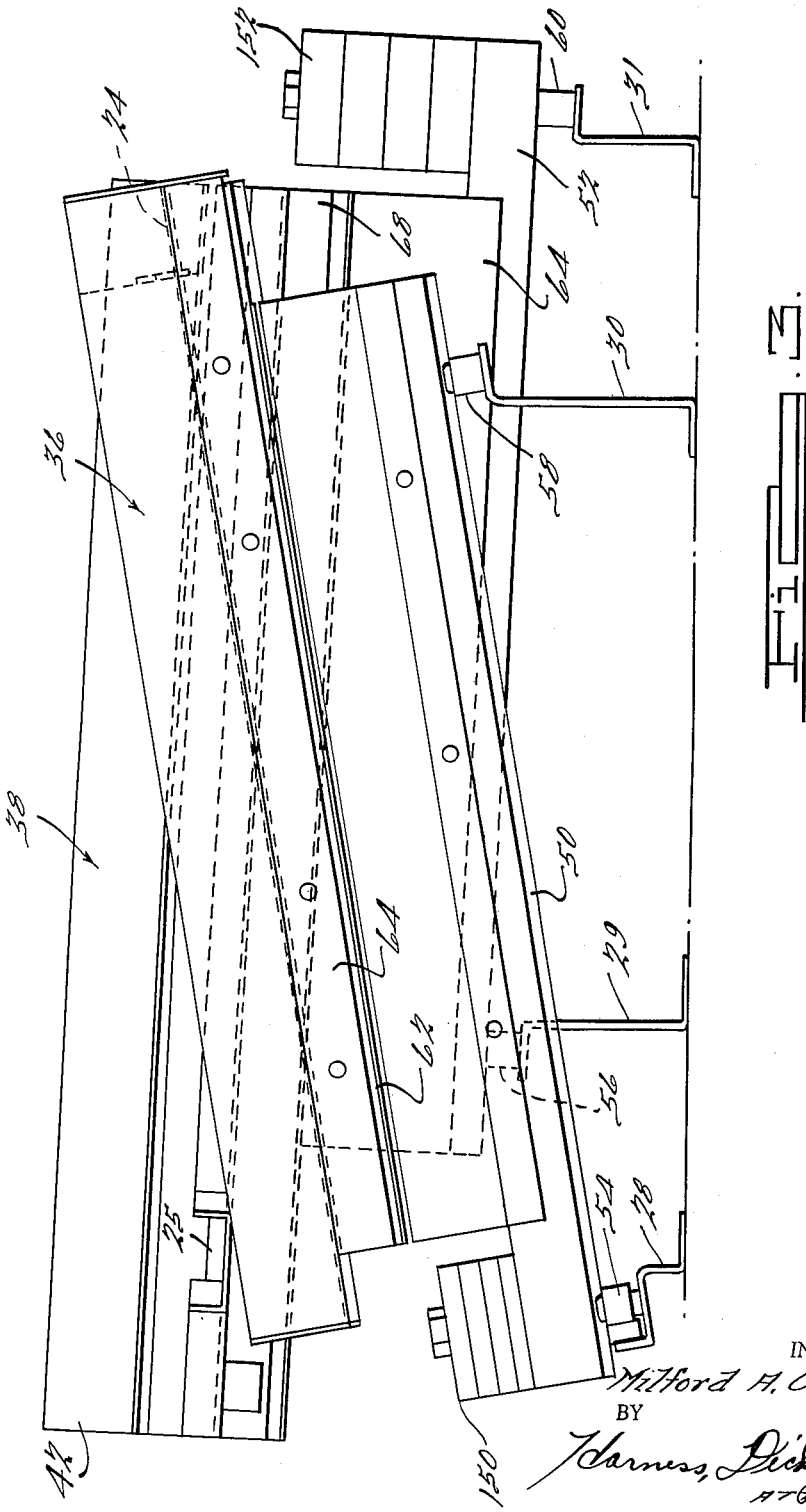
INVENTOR.
Milford A. Campbell
BY
Harness, Dickey & Pierce
ATTORNEYS.

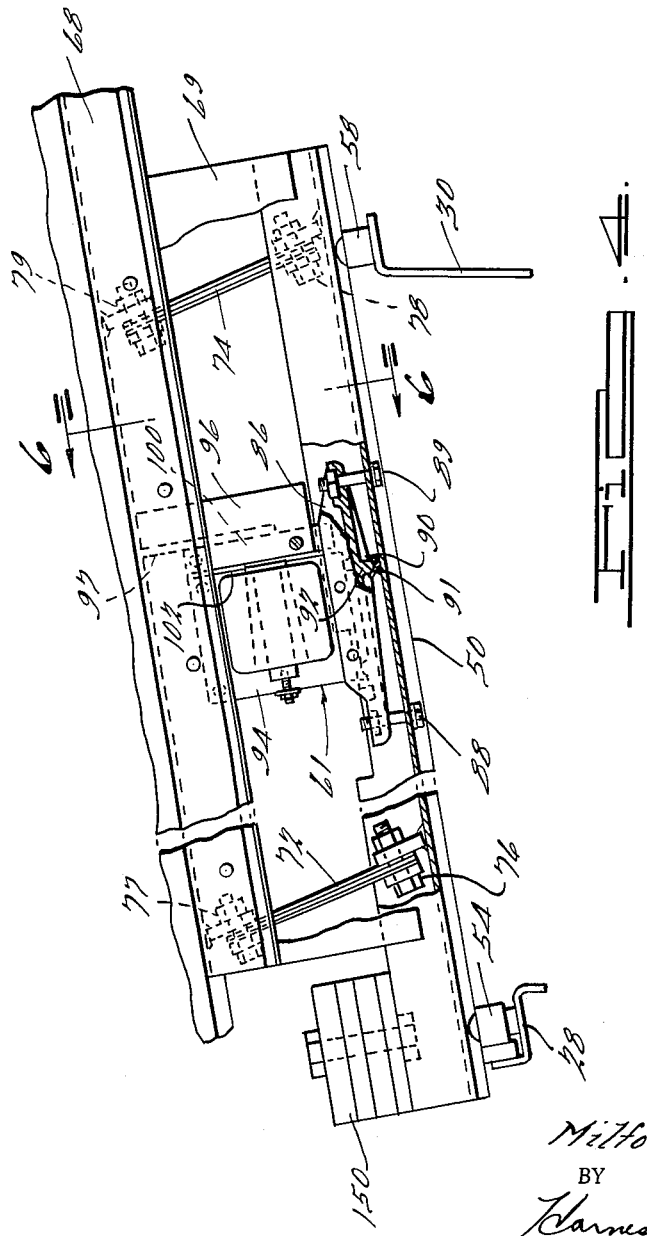

Dec. 21, 1965  M. A. CAMPBELL  3,224,553
VIBRATORY WORK FEEDING AND ORIENTING UNIT
Filed Feb. 27, 1963  4 Sheets-Sheet 4
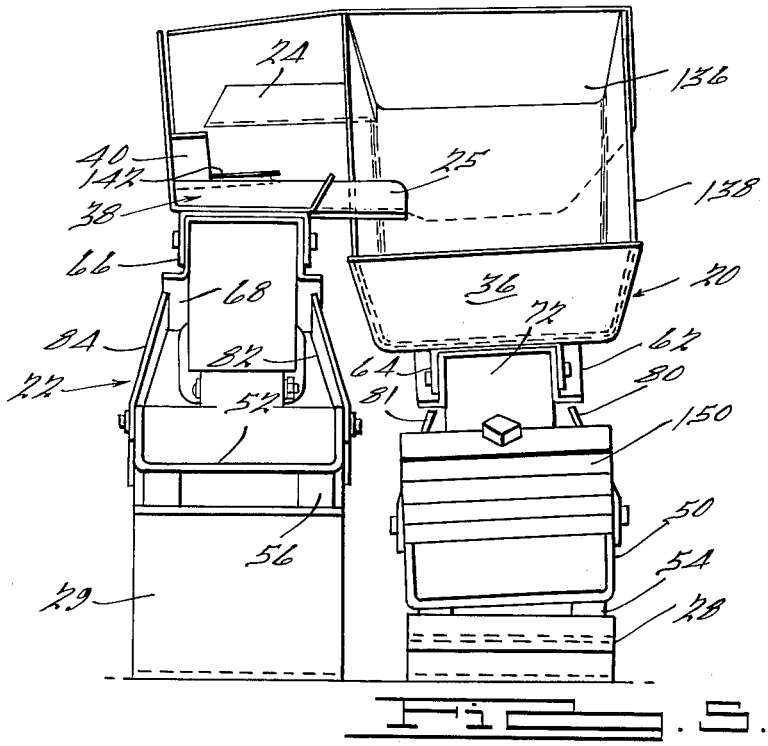
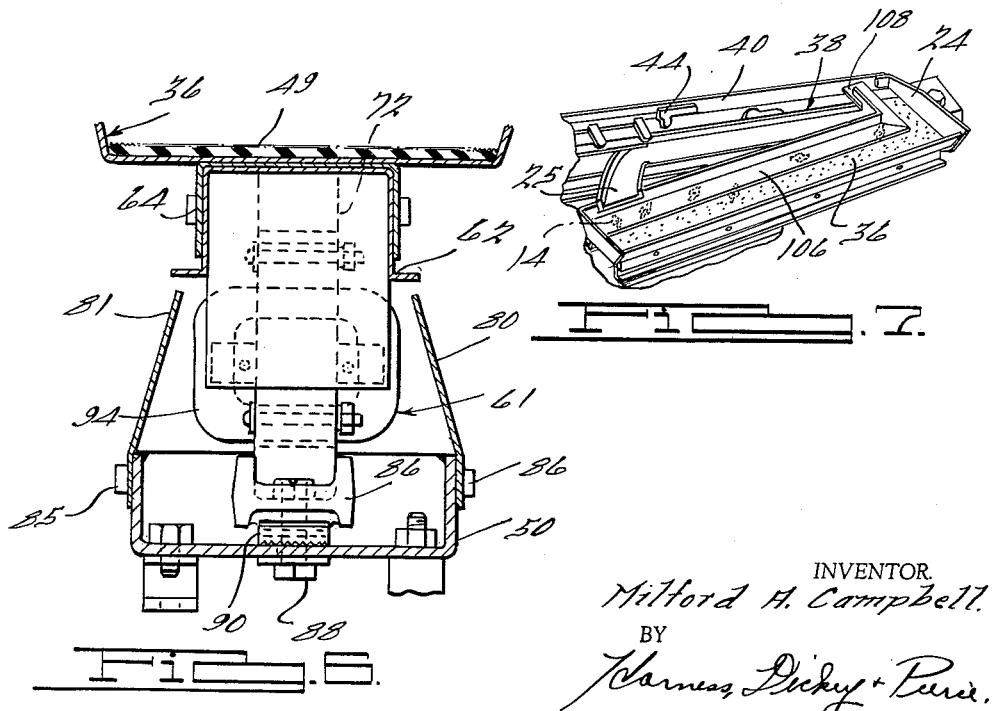
INVENTOR.
Milford A. Campbell
BY
Harness, Dickey & Pierce
ATTORNEYS

United States Patent Office 3,224,553
Patented Dec. 21, 1965

3,224,553
VIBRATORY WORK FEEDING AND
ORIENTING UNIT
Milford A. Campbell, 17225 MacArthur, Detroit, Mich.
Filed Feb. 27, 1963, Ser. No. 261,363
10 Claims. (Cl. 198—33)

This invention relates to vibratory feed apparatus and more particularly to straight line type vibratory feeders.

The various uses of vibratory feed mechanisms in industry to feed parts in assembly operations, and the like, are well known. In general, the most common types of feeders in use may be classified as spiral track feeders and straight line feeders. Spiral track feeders are characterized by bowls or hoppers from which articles are fed from the bottom up a spiral trackway to feed chutes of various designs. Straightline type feeders are characterized by feeding of the parts along substantially rectilinear feed track paths instead of curvilinear as in the bowl type feeders. Conventionally, orienting devices are provided along the various trackways to prepostion the articles for delivery in a predetermined condition. This invention relates, in its broadest aspects, to vibratory feeders of either the bowl-type or the straightline type; but is particularly directed in the narrower aspects of the invention to straightline type feeders.

A primary object of the present invention is to provide a vibratory feeder having a maximum amount of feed rate controllability and adaptability to use in varying feed environments and conditions. To this end, the vibratory feed mechanism is separated into a reservoir drive unit and an orienter drive unit. The dual drives enable the units to be provided with separate controls. Accordingly, the orienter drive is individually controllable for obtaining optimum orientation results and optimum feed rates for particular feed requirements while the separate reservoir drive unit may be adjusted to maintain exceptionally high feed rates from the reservoir unit to the orienter unit. Controlled metering of the parts flow onto the orienter unit may thus be provided so that the flow rate from the reservoir will not adversely affect orienter performance by lack of parts or by feeding too many parts.

Another object of the present invention is to provide a vibratory feed mechanism having positive "live feed" of parts being fed. To this end all portions of the feed system from the supply reservoir to the actual work area receiving the parts utilize positive vibratory drive. Accordingly, the use of multiple feed outlets is effectively improved. Furthermore, the necessity for having substantial loading heights to permit satisfactory prior art type gravity feeding are eliminated. Consequently, the parts reservoir and delivery chute can readily be located in various positions, even below the work station.

A further object of the present invention is to provide vibratory feed drive mechanism having no moving parts and being mechanically adjustable to vary the speed of operation. To this end, an electromagnetic drive is provided which is adjustable by mechanical positioning means to eliminate the necessity for a rheostat or equivalent control.

Still another object of the present invention is to provide a special feed surface along the feed tracks which enables the angle of inclination of the feed track to be considerably increased. To this end, the feed tracks are coated or otherwise provided with a high friction surface such as rubber, vinyl, or other suitable material. In the preferred arrangement, the material is provided with a grained-type or pebbled surface to promote traction between the parts and the feed tracks.

Still another object of the present invention is to provide improved means to control the feed rate of parts on the various feed tracks. To this end control weights are adapted to be selectively mounted on each of the separate drive units to control the rate of vibration and hence the feed rate of the parts in each unit.

Still another object of the present invention is to provide separate and individual reservoir feeding and orienting vibratory feed units which are arranged in a new and improved manner facilitating ready installation with a minimum of space requirements. In this connection, another object is to provide replaceable feed and orienting track parts so that the same equipment may be readily adapted for use to feed parts of varying sizes and shapes at varying speed rates.

A further object in this regard is to provide readily separable operable feed and orienting units having replaceable feed and orienting tracks so that the vibratory feed system may be readily changed from a single outlet system to a multiple outlet system.

The inventive principles by which the foregoing objects, and others, are attained are herein described in detail by reference to the accompanying drawing wherein:

FIGURE 3 is a side elevational view of the apparatus shown in FIG. 1;

FIGURE 4 is another side elevational view of the apparatus shown in FIG. 1, with parts removed and partly in section;

FIGURE 5 is an end view of the invention;

FIGURE 6 is a sectional view taken along the line 6—6 in FIG. 4; and

FIGURE 7 is a partial perspective view of an alternative embodiment of the invention.

Figure 1:
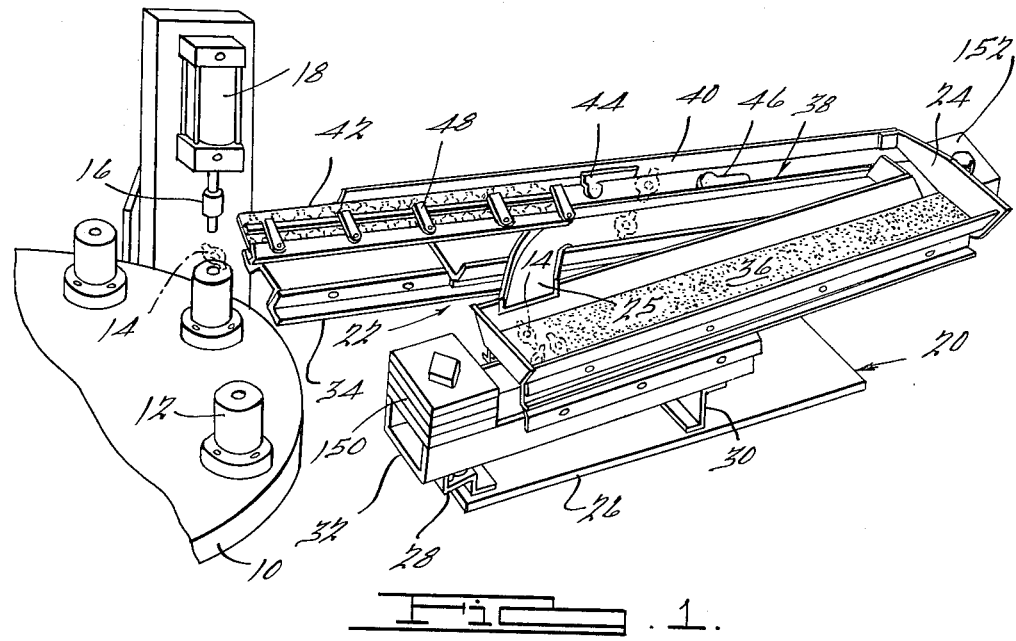
FIGURE 1 is a perspective view of a vibratory feed system incorporating the inventive principles.

Referring now to FIG. 1, the subject feed system is shown, by way of example, in position adjacent a rotatable indexable work table 10 having a plurality of fixtures 12 thereon adapted to receive a washer type part 14. A forming tool 16 operable by a fluid motor 18, or the like, is adapted to perform an operation on the part 14 after it has been received on one of the fixtures.

Figure 2:
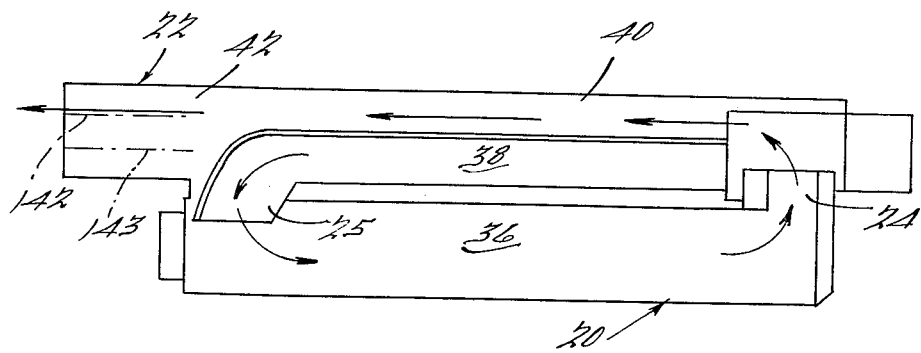
FIGURE 2 is a schematic flow diagram of the movement of parts by the system shown in FIG. 1.

The vibratory feed system comprises separate feed units 20, 22 which are connected in a circulatory feed path at one end by a feed chute 24 and at the other end by a return chute 25; but which are otherwise separate units having separate drive mechanisms. In general, the units may be mounted on any convenient base or surface 26 by suitable brackets which may be either fixed or vertically adjustable. Fixed supports 28, 29, 30, 31 are here shown by way of illustration. Each vibratory unit includes drive portions 32, 34 and parts holding portions 36, 38. The part holding portion 36 is, preferably, in the form of a relatively deep elongated tray which serves as a reservoir for parts and from which parts are fed to the feed chute 24 and to which parts are returned by the return chute 25. The part holding portion 38 comprises, essentially, an elongated track which is divided into a part orienting section 40 and a part delivery section 42. Conventional baffle and orienting devices 44, 46 are provided on the section 40 and serve to orient the parts prior to arrival on the delivery track section 42 and to deflect unoriented parts into the return chute 25. A guide rail 48, or the like, may be provided to maintain the parts in the oriented condition during travel along the delivery section 42. The surfaces of the units along which the parts move are preferably provided with coatings 49, as seen in FIG. 6, of rubber or plastic or the like, having pebbled or grained surfaces promoting part traction during movement. The flow of parts is substantially as shown diagrammatically in FIG. 2.

Referring now to FIGS. 3 and 6, each of the vibratory drive units include base beam portions 50, 52 which may be substantially U-shaped in cross section. The beams are mounted on the bracket members 28, 29, 30, 31 by pairs of rubber feet, or the like, 54, 56, 58, 60 in opposite upwardly inclined positions. Each of the base beams 50, 52 support a drive unit identical to the drive unit 61 shown in detail in FIGS. 4 and 6. The part holding portions 36, 38 of each unit are mounted on beam members 62, 64 and 66, 68 which may also be U-shaped in cross section as shown in FIG. 6. The beam members 64, 66 are welded or otherwise suitably secured to the part holding portions 36, 38 and are removably connected to the beams 62, 68 by bolts or the like, to form individual units which may be readily changed to accommodate varying feed requirements. Referring now to FIGS. 4 and 6, the vibratory base beams 50, 52 of each unit are connected to and support the intermediate beams 62, 68 by means of spaced spring supports 72, 74 formed by a plurality of leaf spring elements which are connected by suitable fastener devices such as the bolt means 76, 77 and 78, 79 to permit easy change of the springs 72, 74 as hereinafter described in detail. Each pair of springs are inclined between the base beam and the intermediate beam as shown in FIG. 4. The rate of feed characteristics of the units are dependent, in part, on the stiffness of the support springs. Accordingly, the rate of feed characteristics can be changed by changing the springs or by varying the number of spring elements forming each support.

Since the details of construction of each of the drive units is identical, only the drive unit 61 of the vibratory unit 20 is described in detail. It is to be understood that the other vibratory unit 22 has an identical drive unit. Shrouds are formed on each unit by upwardly extending plates 80, 81, 82, 84 which are fastened to the base beam by suitable fastening devices 85, 86 as seen in FIG. 6. The shrouds terminate short of the intermediate beams to permit movement of the intermediate beams relative thereto.

Referring to FIGS. 4 and 6, each of the drive motors is mounted on an elongated motor frame 86 having a substantially I-shaped cross section, as shown in FIG. 6, and adjustably supported at each end by suitable bolt means 88, 89. The base 86 is also supported intermediately of the bolts 88, 89 on a transverse rocker plate 90 fixedly secured to the base beam 50 and providing a recessed rocking seat 91 (here shown in a V-form) on which a downwardly extending flange 92 of the base 86 is received for rocking movement. Consequently, the angular position of the base plate relative to the base beam 50 is changeable by variously positioning the bolts 88, 89 and lowering and raising opposite ends of the base plate. Motor coil means 94 are mounted on the base plate and are cooperatively associated with an armature portion 96 fixedly secured to the intermediate beams 62, 64 as indicated at 97 to form an electromagnetic pulsating drive of conventional design. Rapid vibratory movement of the beams 62, 64 on the leaf spring supports 72, 74 is obtained by energization of the coils 94 in a conventional manner and an alternate attraction and repulsion of a plate 100 which is spaced from the coils by a suitable gap 102. The with of the gap 102 controls the rate of vibratory movement of the base beam and, consequently, part feed rate. The width of the gap is adjustable by provision of the bolt means 88, 89 and the rocking means 90, 92.

Each of the separated vibratory units of the subject feeding system is provided with separate control means to control the rate of delivery of parts. The control means, in the preferred embodiment, takes the form of removable and replaceable weight elements which are adapted to be mounted on the base beams 32, 34 at 150, 152. By removing or adding weights, the vibratory drive speed and rate of parts feeding can be varied.

An alternative form of reservoir unit is shown in FIG. 7 comprising feed chute means in the form of shelf means 106 spaced above the bottom of the reservoir and extending between the return chute 25 and an outlet 108 spaced above the orienting track portion. The shelf is suitably secured to the side wall of the reservoir 36 and may be slightly downwardly inclined theretoward. Unoriented parts on the orienting unit are few onto the shelf from the return chute 25. Excess parts may spill over the shelf into the reservoir. The parts retained on the shelf are vibratorily driven along the shelf to the orienter unit. Manifestly, the feed capacity of the reservoir unit is increased by the provision of separate feed tracks spaced above one another to deliver parts to the common orienter unit 38 and the combined units can handle the process a greater number of parts than the form of the invention first described. As a result, it is necessary to reload the feed units less frequently and there is less likelihood that the device will inadvertently run short of parts. Another advantage of the elevated feed track construction shown in FIG. 7 is that the delivery end of the feed track 160 and the receiving end of the orienting tooling can be disposed higher, without unduly increasing the angle of inclination or tilt of the feed unit, than if the parts are simply fed from the bottom of the reservoir as shown in FIG. 1. In this connection, it will be apparent that, while some variation in the tilt angle of the feed unit is possible, the parts will not move up the inclined bottom of the unit or alternatively the rate of feed will be unduly reduced if the unit is tilted at too great an angle. Also, as the tilt angle increases, the capacity of the reservoir area is reduced so that the feed and orienting units can handle a lesser number of total parts and this in turn requires more attention by the operator in order to assure a constant and adequate supply of parts to the machine. Additional height at the discharge end of the feed unit and at the receiving end of the orienting unit also may be necessary or desirable where the tooling has an inclined section for isolating the parts by gravity so that they can be fed or supplied individually to the machine. Thus, the particular arrangement here shown permits the quantity of parts fed to the orienting tooling to be more accurately and exactly controlled. Also, it is possible to preorient parts on the feed track 106 by associating with the track conventional baffle or orienting devices such as the one shown at 44, for example, and many parts require the preliminary orienting step because of their particular shape or for other reasons. In conclusion, therefore, it will be apparent that the arrangement shown in FIG. 7 increases the versatility of the device and the adaptability of the feeding and orienting device to varations in conditions frequently occurring in use.

In operation, workpieces or parts 14 are placed in the reservoir portion 36 of the system. Current is thereafter fed intermittently through the solenoid drive unit to vibrate the reservoir portion and drive parts toward the feed chute 24. The parts move progressively along the bottom of the reservoir to the discharge chute and are delivered to the track portion 38. The track forming apparatus and orienting apparatus provided on the top of the feed unit 22 are replaceably mounted and may be changed to accommodate different articles and different feed requirements. Whereas, in the illustrative embodiment of FIG. 1, a single feed groove is shown, a plurality of similar feed grooves 142, 143 may be provided in parallel relationship along the same track unit. With a plurality of discharge tracks, the orienting devices on the orienting section of the apparatus would correspondingly be changed to provide three different orienting path approaches to the discharge tracks. As shown in FIG. 5, a plurality of discharge tracks are most advantageously accommodated by slightly inclining the unit 36 downwardly toward the unit 38 whereby the parts may be fed onto the outermost track from the unit 36 and caused to cascade down over the subsequent tracks to a lower track located adjacent the inner wall of the unit for delivery to the return chute 25.

By making the feed and orienting units separate in the manner hereinbefore described, it is possible to move parts in the feeding unit 36 at a different rate than those being moved along the orienting unit 38. In this manner, the flow characteristics of the parts can be more accurately controlled to obtain a particular overall result. For example, if the shape of a part is such that it is not readily oriented when randomly delivered to the orienting unit, there will be an excessive number of rejects leaving gaps in the feed track portion 42. In such a case, it may be necessary or desirable to deliver the parts to the orienting unit at a faster rate sufficient to fill the feed track portion. In other situations, an orienting unit with only one track may be unable to deliver parts at a sufficiently high rate even with the track completely filled. By changing the number of tracks, the feed rate can be controlled within an extremely wide range. The provision of removable orienting and track apparatus of the unit 38 facilitates rapid and inexpensive conversion from a one-track unit to a two-track unit, or more, by simply changing the tooling on the unit 38 and changing the rate of delivery of parts from the feeding unit 36. Further, it is possible to alter the unit 38 to handle completely different parts by simply providing tooling suitable to the new part on the orienting unit 38 and then adjusting the operation of the feeding unit to deliver parts at a proper rate. The entire feed units 36, 38 are also easily replaceable, as units, by simply detaching the beams 64, 66 from the beams 62, 68, respectively.

Since the subject units may be variously changed to handle different parts, it is also necessary to provide means to change the feed rate of the units to accommodate the various changes. It is known that the rate of delivery of parts, in a particular vibratory feed system, varies depending upon the mass of material being handled. For example, the feed rates of vibratory units tend to vary from a minimum when the system is heavily loaded and the reservoir is relatively full to relatively fast feed rates when the system is relatively lightly loaded and the reservoir is relatively empty. In addition, the operation of the feeding unit and the rate of feed of parts attained depends upon the size and weight of the individual part being handled. Furthermore, the weight of the various tooling put on the tracks also affects feed rates.

Therefore, various means are provided to adjust the feed rates of each of the units to obtain desired feed characteristics for different tooling and/or parts. One control means takes the form of removable weights on the ends of the beams 50, 52 which can be mounted on the lower ends of the beams as shown or on the opposite ends of the units 36 and 38. The beam mounting is preferred as it provides a little better control of the vibratory action. By adding or removing weights, it is possible to change the position of the beams to regulate the center of gravity and vary the natural vibrating frequency of the unit. Consequently, the addition or removal of weights changes the feed rate in a manner not dependent solely on the weight added or subtracted from the vibratory unit but on the change in position of the vibratory unit attained by placement of the weights. Since the vibratory units are separate, the rate at which the parts flow can be varied in different sections of the travel path depends upon the effect of the weights on each vibratory part. In such a system, it is possible, for example, to speed up the movements of parts at the discharge end of the feed chute. Furthermore, the addition and removal of weights may also be utilized to obtain a smooth feed operation for one type of part or to produce a high amplitude bouncing vibration which may be more suitable for another type of part. Thus, the rate of feed and the type of movement induced during the feed can be varied through a wide range of feed rates and movements.

In order to further control the operating characteristics of the units, each of the drive units is provided with means to adjust the gap between the electromagnetic drive portions. In the preferred form, the gap is varied by adjusting the fastening devices 88, 89 to rock the support frame in the V mounting. The adjustment is mechanical and permits wide variations in gap width with positive control settings.

The provision of the pebbled or grained surfaces 49 on the trackways facilitates movement of parts. By using a coating or covering to increase traction, the angle or inclination of the tracks may be substantially increased to obviate the necessity, in prior art devices, to utilize substantially flat low pitch trackways on which the parts often pile up and pyramid at high feed rates.

Since the aforedescribed inventive principles are capable of being utilized in alternative embodiments, and with modifications and rearrangements of the disclosed vibratory feed apparatus, it is intended that the scope of the invention, as defined by the appended claims, be construed to include alternative embodiments and arrangements wherein the inventive principles are utilized.

The invention claimed is:

1. In a vibratory feed system for delivering parts from a reservoir to discharge means in a predetermined condition comprising: a straight line trough-like reservoir feed unit including a parts reservoir provided at the bottom of said feed unit, an elongated upwardly extending straight line feed path provided by said reservoir feed unit, a support base for said reservoir feed unit, an electromagnetic drive mounted on said support base, spring means mounted on said support base and movably supporting said reservoir feed unit, electromagnetic operable means connected to said reservoir feed unit and being responsive to said electromagnetic drive to impart vibratory movement to said reservoir feed unit, changeable weight means mounted on said support base to vary the rate of movement of said reservoir feed unit, an outlet from said reservoir feed unit, track means extending to said outlet to discharge parts therethrough; a straight line trough-like orienting feed unit including an elongated upwardly extending straight line feed path, a support base for said orienting feed unit, an electromagnetic drive mounted on said support base, spring means mounted on said support base and movably supporting said orienting feed unit, electromagnetically operable means connected to said orienting feed unit and being responsive to said electromagnetic drive to impart vibratory movement to said orienting feed unit, changeable weight means mounted on said support base to vary the rate of movement of said orienting feed unit, track means located adjacent said outlet from said reservoir feed unit to receive parts therefrom, orienting means provided on a first portion of said track means to arrange parts in the predetermined condition, return means to receive unoriented parts and return such parts to said reservoir feed unit, and guide means to convey parts in the oriented condition to said discharge means.

2. A vibratory feed unit for delivering articles from a common mass to an outlet in a predetermined condition comprising a reservoir portion for the mass of articles, an orienting portion to place the articles in the predetermined condition, first feed chute means connecting said reservoir portion to said orienting portion, return chute means connecting said orienting portion to said reservoir portion to return articles failing to acquire the predetermined condition, and second feed chute means separately mounted on said reservoir portion and spaced from said first feed chute means to receive articles through said return chute means from said orienting portion and redeliver the articles to the orienting portion adjacent said first feed chute means.

3. The invention as defined in claim 2 and wherein said second feed chute means comprises a shelf connected to a side wall of the reservoir portion and spaced above the mass of articles, said shelf being inclined toward said side wall and extending in said reservoir portion from said return chute means to said orienting portion adjacent said first feed chute means to provide a supply of articles to said orienting portion in addition to the supply of articles being delivered from the reservoir portion.

4. A vibratory feed system comprising a feed hopper having an upwardly inclined feed track, a vibratory base supporting said feed hopper, removable and replaceable weight means attached to said vibratory base, a separate feed track connected to said upwardly inclined feed track of said feed hopper and forming a continuation thereof, a separate vibratory base supporting said separate feed track, and separate removable and replaceable weight means attached to said separate vibratory base.

5. A straight line type vibratory feed system comprising an elongated channel-shaped parts hopper having an upwardly inclined feed track, a high friction surface provided on said feed track, vibrating mechanism connected to and supporting said parts hopper and being operative to drive parts up said upwardly inclined feed track, additional feed track means connected to said upwardly inclined feed track and forming an extension thereof, a high friction surface provided on said additional feed track means, and separate vibrating mechanism connected to and supporting said additional feed track means to drive parts along said additional feed track means as the parts are received from said upwardly inclined feed track, said vibrating mechanism supporting said parts hopper and said separate vibrating mechanism having separate control means whereby different feed rates may be established for said upwardly inclined feed track and said additional feed track means.

6. The invention as defined in claim 5 and wherein said control means comprises mechanical positioning means associated with electromagnetic drive means.

7. The invention as defined in claim 5 and wherein said control means comprises control weight means adapted to be selectively mounted on each of the vibrating mechanisms.

8. A vibratory feed system comprising trackway means for delivering parts to discharge means, delivery means for delivering parts from a source of supply to said trackway means, a plurality of feed paths formed by separate feed channels along at least a portion of said trackway means, orienting means to orient parts on each of said feed channels, said feed channels being located at different successively lower elevations, said delivery means terminating adjacent the feed channel of highest elevation, means for directing unoriented parts from the feed channel of highest elevation successively over the feed channels of lower elevation, and return means to return unoriented parts from said trackway means to the source of supply.

9. A drive unit for a vibratory feed apparatus comprising a base portion, a part feeding portion, electromagnetic drive means, a fixed portion of said electromagnetic drive means mounted on said base portion, a movable portion of said electromagnetic drive means mounted on said part feeding portion, a gap separating said fixed portion of said electromagnetic means and said movable portion of said electromagnetic means and controlling the rate of movement of said movable portion of said electromagnetic means, rocking means centrally mounted below said electromagnetic drive means between said fixed portion of said electromagnetic drive means and said base portion, and adjusting screw fastening means located on opposite sides of said rocking means to rockably adjust said fixed portion of said electromagnetic means relative to said movable portion of said electromagnetic means to vary the width of said gap.

10. A drive unit for a vibratory feed apparatus comprising a base portion, a part feeding portion, electromagnetic drive means having a fixed portion and a movable portion, an elongated motor frame having substantially I-shaped cross section supporting said fixed portion of said electromagnetic drive means, a transverse rocking flange centrally located on said motor frame and extending downwardly therefrom, rocking plate means mounted below said motor frame on said base portion, a transverse recessed rocking seat formed on said rocking plate and receiving said rocking flange for rocking movement of said motor frame relative to said rocking plate, adjustable bolt means supporting said motor frame relative to said rocking plate whereby the angular position of the motor frame relative to the rocking plate may be adjustably varied, and the movable portion of said electromagnetic drive means being mounted on said part feeding portion to define a gap with the fixed portion of the electromagnetic means, the width of said gap controlling the rate of movement of said movable portion of said electromagnetic means.

References Cited by the Examiner

UNITED STATES PATENTS

| | | | |
|---|---|---|---|
| 1,719,221 | 7/1929 | Gibney | 198—33 |
| 2,071,443 | 2/1937 | Weckerly. | |
| 2,094,697 | 10/1937 | Flint. | |
| 2,444,134 | 6/1948 | Hittson. | |
| 2,446,752 | 8/1948 | Fiddyment. | |
| 2,466,936 | 4/1949 | Dowie et al. | 198—33.1 |
| 2,481,131 | 9/1949 | Lindsay. | |
| 2,764,351 | 9/1956 | Broscomb et al. | |
| 2,794,539 | 6/1957 | Philippovic. | |
| 2,819,788 | 1/1958 | Howard. | |
| 3,084,782 | 4/1963 | Bower | 198—33.1 |
| 3,087,603 | 4/1963 | Petrea. | |
| 3,114,448 | 12/1963 | Boris | 198—33.1 |

FOREIGN PATENTS 722,016   1/1955   Great Britain.

OTHER REFERENCES

Reprinted article entitled "Orienting—Feeding Small Parts," by Dick Dietz, Assoc. Editor. A reprint from October 1962 issue of Material Handling Engineering magazine; 4 pages.

SAMUEL F. COLEMAN, *Primary Examiner.*

WILLIAM B. LABORDE, *Examiner.*